US009131105B2

(12) United States Patent
    Bansal

(10) Patent No.: US 9,131,105 B2
(45) Date of Patent: Sep. 8, 2015

(54) DYNAMIC TELEPRESENCE SYSTEM AND METHOD

(76) Inventor: Sanjay Bansal, Gurgaon (IN)

( * ) Notice: Subject to any disclaimer, the term of this patent is extended or adjusted under 35 U.S.C. 154(b) by 54 days.

(21) Appl. No.: 14/004,084

(22) PCT Filed: Mar. 2, 2012

(86) PCT No.: PCT/IN2012/000150
§ 371 (c)(1),
(2), (4) Date: Oct. 8, 2013

(87) PCT Pub. No.: WO2012/120540
PCT Pub. Date: Sep. 13, 2012

(65) Prior Publication Data

US 2014/0022331 A1    Jan. 23, 2014

(30) Foreign Application Priority Data

Mar. 10, 2011  (IN) .............................. 681/DEL/2011

(51) Int. Cl.
    *H04N 7/14*    (2006.01)
    *H04N 7/15*    (2006.01)
(52) U.S. Cl.
    CPC . *H04N 7/142* (2013.01); *H04N 7/15* (2013.01)
(58) Field of Classification Search
    CPC ............................. H04N 7/14; H04L 12/1822
    USPC ........................ 348/14.08; 370/260; 709/204
    See application file for complete search history.

(56) References Cited

U.S. PATENT DOCUMENTS

| 7,587,747 | B2  | 9/2009  | Maguire, Jr.              |
|-----------|-----|---------|---------------------------|
| 7,710,448 | B2* | 5/2010  | De Beer et al. ... 348/14.01 |
| 8,390,663 | B2  | 3/2013  | Derocher et al.           |
| 8,441,516 | B2* | 5/2013  | Satyanarayanan et al. ... 348/14.09 |
| 8,599,236 | B2  | 12/2013 | Prentice                  |
| 8,872,882 | B2  | 10/2014 | Shanmukhadas et al.       |
| 2005/0152447 | A1 | 7/2005 | Jouppi et al.             |
| 2007/0263079 | A1* | 11/2007 | Graham et al. ... 348/14.08 |
| 2008/0246834 | A1 | 10/2008 | Lunde et al.              |
| 2009/0079815 | A1 | 3/2009 | Baird                     |

(Continued)

FOREIGN PATENT DOCUMENTS

WO    WO 2012/117422    3/2012

OTHER PUBLICATIONS

International Search Report issued in PCT/IN2012/000150, dated May 11, 2012, 1 page.
"Cisco TelePresence System 3200," Data Sheet, Cisco Systems, Inc., www.cisco.com/en/US/prod/collateral/ps7060/ps8329/ps8330/ps9573/data_sheet_c78-457905.pdf, Jan. 2010, 7 pages.

(Continued)

*Primary Examiner* — Creighton Smith
(74) *Attorney, Agent, or Firm* — Klarquist Sparkman, LLP

(57) ABSTRACT

A telepresence participating room configured for audio visual communication with a plurality of other participating rooms is disclosed. The telepresence participating room comprises of a plurality of participant sections, a display system including a center stage and a participant stage, a plurality of codecs for powering the display system, a plurality of cameras for sharing audio-visuals with the other participating rooms and a network switch for enabling communication with the other participating rooms, such that when a control signal originates in a participant section of a participating room, that participant section is considered an active participant section. Herein, the display system is configured to display the active participant section in lifelike mode on the center stage as well as continuously display all the participating rooms on the participant stage.

18 Claims, 11 Drawing Sheets

(56) References Cited

U.S. PATENT DOCUMENTS

| | | | |
|---|---|---|---|
| 2010/0002069 | A1 | 1/2010 | Eleftheriadis et al. |
| 2010/0073454 | A1 | 3/2010 | Lovhaugen et al. |
| 2010/0097441 | A1 | 4/2010 | Trachtenberg et al. |
| 2010/0250315 | A1 | 9/2010 | Landau et al. |
| 2010/0318921 | A1* | 12/2010 | Trachtenberg et al. ....... 715/751 |
| 2011/0026441 | A1 | 2/2011 | Diener et al. |
| 2011/0285809 | A1 | 11/2011 | Feng et al. |

OTHER PUBLICATIONS

"Multipoint Solution for Cisco TelePresence Systems," White Paper, Cisco Systems, Inc., www.cisco.com/en/US/prod/collateral/ps7060/ps8329/ps8331/ps7315/white_paper_c11-610159.pdf, Jul. 2010, 13 pages.

International Search Report and Written Opinion for related International Application No. PCT/IN2012/000151, dated Jun. 6, 2012, 6 pages.

\* cited by examiner

DYNAMIC TELEPRESENCE SYSTEM AND METHOD

CROSS REFERENCE TO RELATED APPLICATIONS

This is the U.S. National Stage of International Application No. PCT/IN2012/000150, filed Mar. 2, 2012, which was published in English under PCT Article 21(2), which in turn claims the benefit of India Application No. 681/DEL/2011, filed Mar. 10, 2011. Both applications are incorporated herein in their entirety.

TECHNICAL FIELD

This invention relates to the field of telepresence systems and methods.

BACKGROUND

As the global economy continues to expand, so does the need to be able to effectively communicate over distances. One area of communication that has seen steady growth and increased customer confidence is the use of telepresence. Telepresence has become an important and effective way of communication between individuals and groups over short and long distances. Telepresence creates an environment where a participant's meeting experience is similar to a real world meeting. In a telepresence environment, locations over short and long distances are connected via high speed video bandwidth communications links, and an appropriate conferencing bridge. The key requirements of a telepresence experience are appearance as real size life like images, good eye contact between the viewer and the speaker, and stereo spatial audio of the speaker along with excellent video quality.

However, while prior telepresence systems have provided improvements over audio/video conferencing systems, bulk of the requirements of telepresence are limited to a two location meeting only. The disparity between in-person conferences and the telepresence systems for the multiple locations meetings remains substantial. Conventionally, in a telepresence meeting involving multiple participants across multiple locations, each location was able to see the active speaker location in real-size life like mode, while other participant locations were not visible. As and when different participant locations became active by starting to speak, those locations were made visible to other participant locations. The switching from one active participant location to another is generally voice based in that a participant location was required to speak continuously for a few seconds before it was moved to the screens of the other participant locations. Such systems result in a huge disconnect between all participants as participants are only able to see the speaking location resulting in huge degradation of the meeting experience in comparison to a face to face meeting for everyone.

Some other telepresence systems allow all participant locations to simultaneously see all other participant locations on their screens. This is achieved by splitting the available screen(s) space equally amongst the other participant locations, and all participants from each location are displayed on the allocated screen space. However, by splitting the available screen space to accommodate all participant locations, the telepresence experience is completely compromised because participants do not appear real size and life like. There is no eye contact and also there is no stereo spatial audio of the speaker. On account of this users are required to continuously scan the display screens, examining each user individually, to determine the person speaking. This is especially very difficult in a situation in which the screen is divided among several participant locations, and each location has multiple users within the camera's field of vision.

BRIEF DESCRIPTION OF DRAWINGS

The following is a brief description of the preferred embodiments with reference to the accompanying drawings. It is to be understood that the features illustrated in and described with reference to the drawings are not to be construed as limiting of the scope of the invention. In the accompanying drawings.

SUMMARY

Figure 1A:
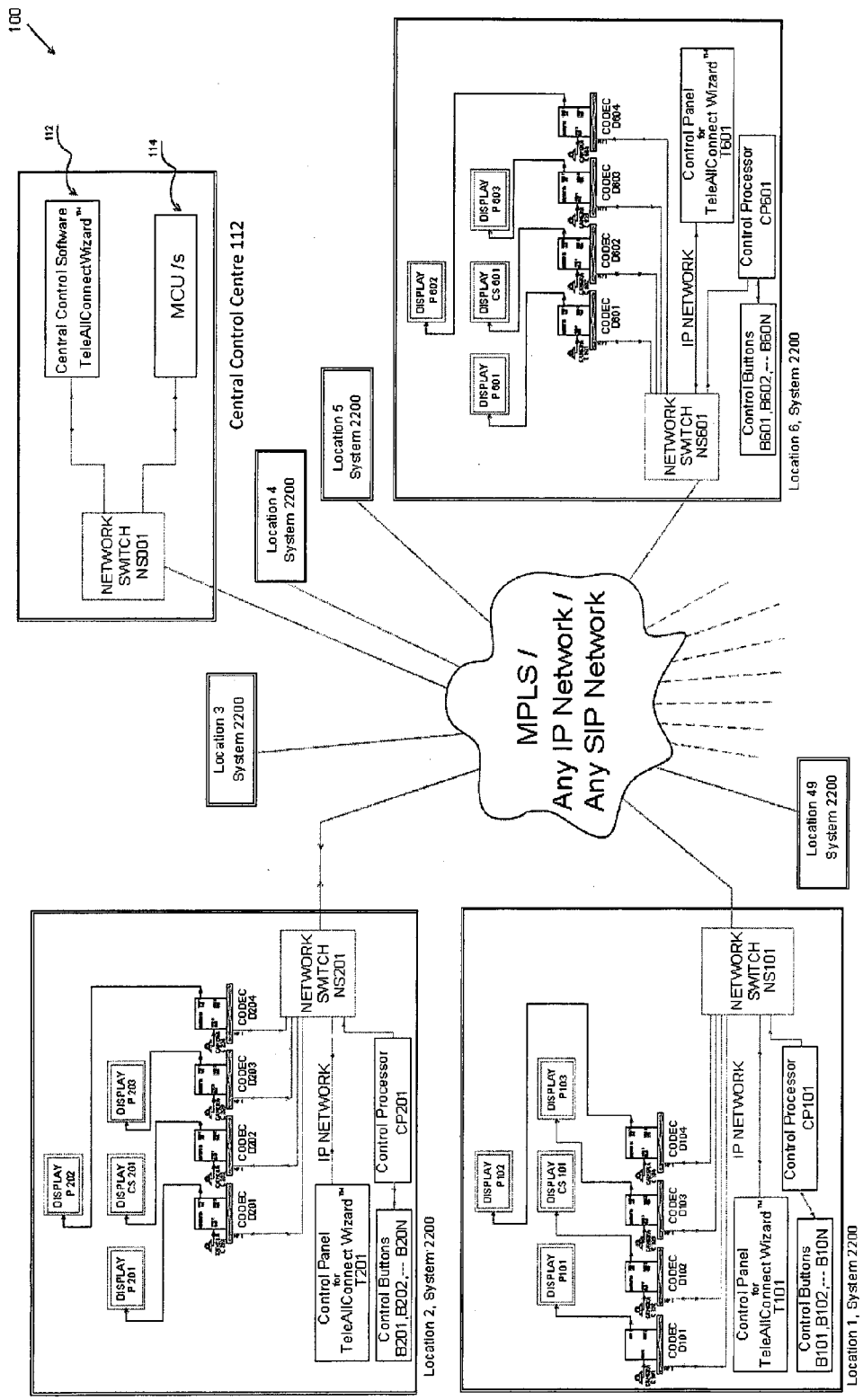
FIGS. 1A and 1B are schematic illustrations of a telepresence system in accordance with an embodiment of the invention which would be henceforth called as Dynamic TeleAllpresence™ system.

A telepresence participating room configured for audio visual communication with a plurality of other participating rooms is disclosed. The telepresence participating room comprises of a plurality of participant sections, a display system including a center stage and a participant stage, a plurality of codecs for powering the display system, a plurality of cameras for sharing audio-visuals with the other participating rooms and a network switch for enabling communication with the other participating rooms, such that when a control signal originates in a participant section of a participating room, that participant section is considered an active participant section. Herein, the display system is configured to display the active participant section in lifelike mode on the center stage as well as continuously display all the participating rooms on the participant stage.

A telepresence participating room configured for audio visual communication with a plurality of other participating room is disclosed. The telepresence participating room comprises of a plurality of participant sections, a display system including a center stage and a participant stage, a plurality of codecs for powering the display system, a plurality of cameras for sharing audio-visuals with the other participating rooms and a network switch for enabling communication with the other participating rooms, such that either when an audio signal originates in a participating room that participating room is considered an active participant room or when a control signal originates in a participant section of a participating room, that participating room is considered an active participating room and that participant section is considered an active participant section. Herein, the display system is configured to display the active participating room or the active participant section in a lifelike mode on the center stage as well as continuously display all the participating rooms on the participant stage.

A telepresence system comprising of a plurality of participating rooms is disclosed. Each participating room comprises of a plurality of participant sections, a display system, a plurality of codecs for powering the display system, a plurality of cameras for sharing audio-visuals with the other participating rooms, and a network switch for enabling communication with the other participating rooms, such that when a control signal originates in a participant section of a participating room, that participant section is considered an active participant section. Herein, the display system of at least one participating room comprises of a center stage and a participant stage. The telepresence system further comprises of a central control system in communication with the network switch of each participating room. The central control system is configured to connect the plurality of participating rooms in audio visual communication with each other. The central control system is further configured to identify a participating room with a display system having a center stage and a participant stage and to display the active participant section in life like mode on the center stage as well as continuously display all the participating rooms on the participant stage.

A telepresence system comprising of a plurality of participating rooms is disclosed. Each participating room comprises of a plurality of participant sections, a display system, a plurality of codecs for powering the display system, a plurality of cameras for sharing audio-visuals with the other participating rooms, and a network switch for enabling communication with the other participating rooms, such that either when an audio signal originates in a participating room that participating room is considered an active participating room or when a control signal originates in a participant section of a participating room, that participating room is considered an active participating room and that participant section is considered an active participant section. Herein, the display system of at least one participating room comprises of a center stage and a participant stage. The telepresence system further comprises of a central control system in communication with the network switch of each participating room. The central control system is configured to connect the plurality of participating rooms in audio visual communication with each other. The central control system is further configured to identify a participating room with a display system having a center stage and a participant stage and to display the active participating room or the active participant section in lifelike mode on the center stage as well as continuously display all the participating rooms on the participant stage.

A method of conducting an audio-visual telepresence conference between such plurality of participating rooms is disclosed. The method of conducting the audio visual telepresence conference between the plurality of participating rooms comprises of identifying a participating room with a display system having a center stage and a participant stage and to display the active participant section in lifelike mode on the center stage as well as continuously display all the participating rooms on the participant stage of that participating room.

DETAILED DESCRIPTION

Applicant's co-pending Indian Patent Application 568/DEL/2011 (the material of which is present in International Publication Number WO 2012/117422 A1 for PCT application No. PCT/IN2012/000151) discloses a TeleAllpresence™ system that allows for a highest quality video meeting experience which enables multiple participants across multiple locations to be visible at all times to all participants at all locations in continuous presence while simultaneously ensuring that a speaker location also appears in life like mode. However, transmission of multiple streams of high quality video between a remote location and other participant's location requires a large bandwidth to be available at all locations, which typically vary from 11 Mbps per location to 16 Mbps per location.

As such, TeleAllpresence™ systems are primarily implemented using dedicated bandwidth connections over private networks to get the highest quality. The cost of operating such systems is high.

As the implementation of the TeleAllpresence™ system is bandwidth intensive and expensive, there is a need for a system and method for reducing the bandwidth required in transmitting high quality video between a remote location and other participant locations along with reduction in the capital cost of the system so that it can be implemented in a very big way in the organizations. It is also desirable to have the ability to switch between a higher bandwidth telepresence experience and a lower bandwidth telepresence experience.

Also even for implementation of telepresence experience between two locations 3 cameras (to cover the entire room), 3 codecs and three large displays are required at each location along with a large display or multiple table displays for sharing the content. This also requires a bandwidth of approx 10 Mbps per location.

The cameras in telepresence capture the view in such a way that all the participants are visible in life like and real size. For this to happen all participants have to sit at precise seating locations and place the conference table in such a way that its length is parallel to the placement of cameras. However this is not possible in all kinds of seatings especially in a boardroom where U Shape or horse shoe or V shape sitting is the preferred choice. So as the implementation of telepresence is bandwidth intensive, there is a need for a system and method for reducing the bandwidth required and for reducing the capital cost.

Further currently the telepresence experience is limited to a conference room that has either elliptical or rectangular or oval or a hexagonal table. This is on account of the inability of conventional telepresence systems to provide good eye contact for all the seating positions coupled with life size images for all the speaking locations in a U or V or a horseshoe sitting arrangement. So there is a need for a system and method for empowering the telepresence experience in diverse seating layouts so that it can be further implemented in a big way across organizations such as government, PSUs or defense where U or V or horse shoe sitting layouts are popular.

It will be understood by those skilled in the art that the foregoing objects and the following description of the nature of invention are exemplary and explanatory of the invention and are not intended to be restrictive thereof.

For the purpose of promoting an understanding of the principles of the invention, reference will now be made to various alternative embodiments and specific language will be used to describe the same. It will nevertheless be understood that no limitation of the scope of the invention is thereby intended, such alterations and further modifications in the illustrated method, and such further applications of the principles of the invention as illustrated therein being contemplated as would normally occur to one skilled in the art to which the invention relates.

It will be understood by those skilled in the art that the following description is exemplary and explanatory of the invention and are not intended to be restrictive thereof.

Many of the functional units described in this specification have been labeled as modules, in order to more particularly emphasize their implementation independence. For example, a module may be implemented as a hardware circuit comprising custom very large scale integration circuits or gate arrays, off-the-shelf semiconductors such as logic, chips, transistors, or the other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data maybe collected as a single data set, or may be distributed over different locations including over different member disks, and may exist, at least partially, merely as electronic signals on a system or network.

Reference throughout this specification to "one embodiment" "an embodiment" or similar language means that a particular feature, structure, or characteristic described in connection with the embodiment is included in at least one embodiment of the present invention. Thus, appearances of the phrase "in one embodiment", "in an embodiment" and similar language throughout this specification may, but do not necessarily, all refer to the same embodiment.

The invention relates to a telepresence system and method for conducting a video conference between different locations. In accordance with an embodiment a location is a telepresence participating room.

In accordance with an aspect of the invention, the invention relates to a telepresence system that allows for a high quality audio video meeting experience which enables multiple participants across multiple telepresence participating rooms to be visible at all times to all participants at all participating rooms in continuous presence while simultaneously enabling a part of the active speaker participating room to appear in lifelike mode on a display referred to as the center stage. Furthermore, the telepresence system enables a part of the active speaker participating room or the complete active speaker participating room to appear in a lifelike mode while simultaneously enabling all the participating rooms to be visible at all times to all participants at all participating rooms in continuous presence. Furthermore, the telepresence system also enables the system to switch between displaying the complete active speaker participating room on the center stage or only a part of the active speaker participating room on the center stage. In accordance with an embodiment a part of the telepresence participating room is a participant section. The participant section of the active speaker participating room to be displayed on the centre stage is determined by the participants pressing one of their control buttons provided at each of the participating rooms that generates a control signal. Each participant at every participating room has access to one control button, which may be shared by one or two other adjoining participants also. The participant section of the participating room where the control signal originates is considered to be the active participant section. In accordance with an aspect of the invention, either when an audio signal originates in a participating room that participating room is considered an active participating room or when a control signal originates in a participant section of a participating room, that participating room is considered an active participating room and that participant section is considered an active participant section. The active participant section is displayed or the active participating room is displayed on a center stage while the other participating rooms are displayed continuously on a participant stage. This experience of video conference would henceforth be referred as DynamicTeleAllpresence™ in this document.

Each participating room may be split into two or more participant sections. In accordance with a preferred embodiment, a participating room is split into three participant sections. A control button is provided for each participant section for generating the control signal. In accordance with an embodiment of the invention, the control buttons are positioned on the desk in front of the participants.

In accordance with an aspect of the invention, the telepresence system is configured to display the participant section of speaker participating room where the speaker is currently active in full lifelike real size mode.

For example, till now in a general telepresence system, a participating room is covered by three cameras and three codecs for transmitting high quality videos to other participating rooms in the network for display on the far site. When all the three cameras and three codecs are used to transmit high quality videos, there is usually a need for a 10 or more megabit per second connection as of now. On the other hand, as taught by this disclosure, if the telepresence system selects a participant section of the active participating room which requires only one camera and one codec to transmit high quality videos for the centre stage, a 5 megabit per second connection is generally sufficient.

Figure 1B:
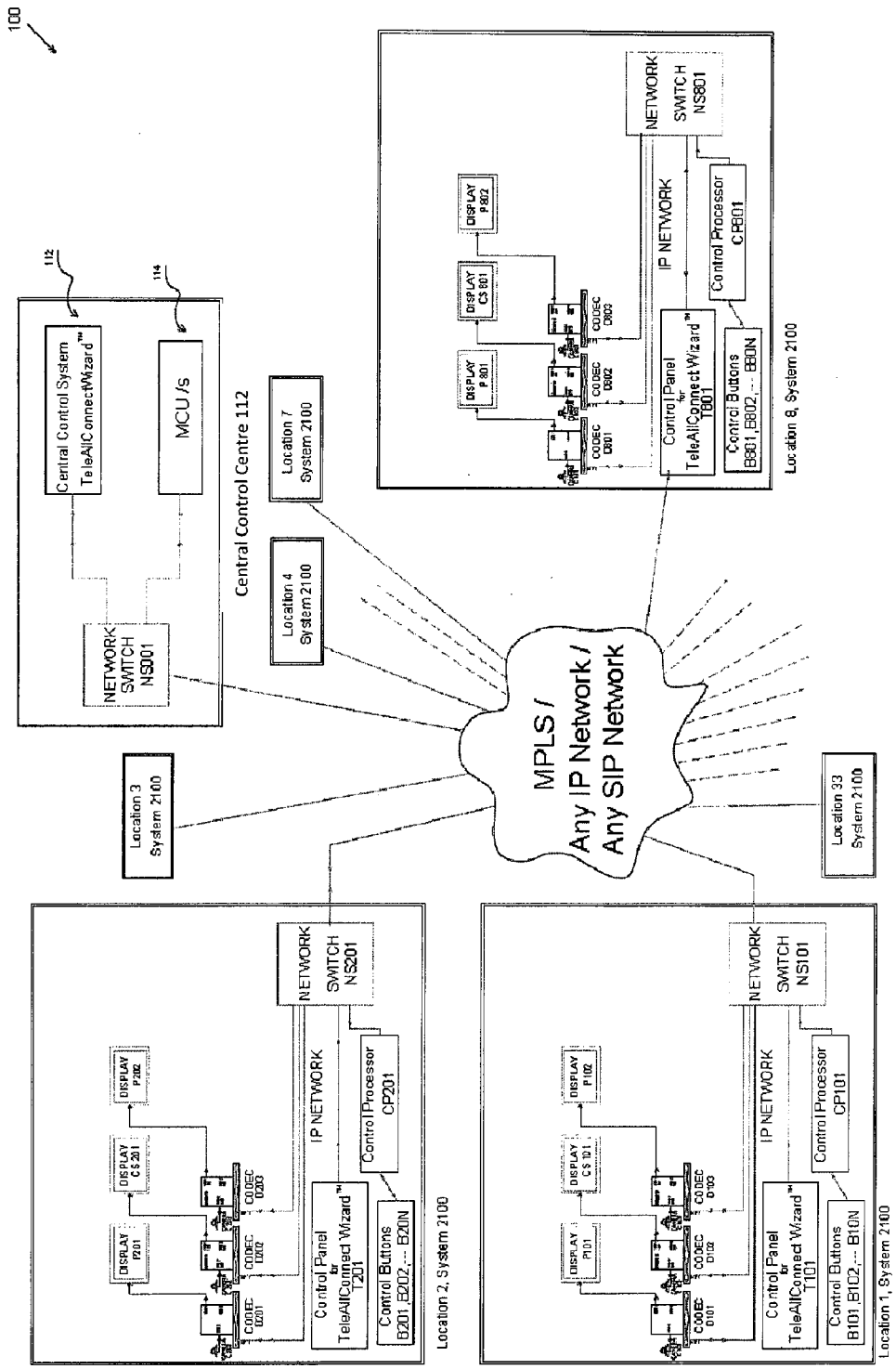

Referring initially to FIGS. 1A and 1B, a Dynamic TeleAllpresence™ system environment (100) in accordance with an embodiment is illustrated. The Dynamic TeleAllpresence™ system environment (100) comprises of a plurality of participating rooms, that are connected by their network switches through the Multiprotocol Label Switching mechanism (MPLS) network/any kind of internet protocol network/any Session Initiation Protocol (SIP) network to a central control system (112). The Multiprotocol Label Switching mechanism (MPLS) network/any other IP network/any Session Initiation Protocol (SIP) network is configured to direct and carry data from one participating room to any other/all participating rooms. The central control system (112) is configured with appropriate modules that enable the teachings of this disclosure. The MCU (114) is a device configured to perform functions like switching between different participating rooms in a teleconference call and serves as a bridge that interconnects calls from several participating rooms. The system also provides several MCU to be used at the same time.

Each telepresence participating room is provided with a set of cameras, codecs and display system for the conference. The display system includes a center stage and a participant stage. The display system comprises of at least one display large enough to include the center stage and the participant stage or a plurality of displays to accommodate the center stage and the participant stage. The cameras, codecs and display system at each telepresence participating room are controlled by a control panel through a control processor and are configured with appropriate modules that enable the teachings of this disclosure. Referring to FIG. 1A, forty nine participating rooms in the embodiment are illustrated. Each participating room in the example illustrated is provided with a set of four displays, four codecs and four cameras. FIG. 1A illustrates an embodiment of the invention where the system is capable of switching between functioning as a TeleAllpresence™ system as described in Applicant's co-pending Application Number 568/DEL/2011 or as a Dynamic TeleAllpresence™ as taught by the present disclosure. For example, participating room 2 (Location 2) includes four displays of which three are configured as participant stage displays (P201, P202 and P203) and one is configured as the center stage (CS 201) display. Each display is powered by a corresponding codec (D 201 to D 204). The cameras (C 201 to C 204) are appropriately positioned in the room to capture the entire conference room as per the instructions of the control processor (CP201).

Of the four cameras, one camera is configured to capture the entire participating room for display on the participant stage display at other participating rooms. This is generally a lower quality video requiring low bandwidth of approximately 1 Mbps. The remaining cameras are configured to capture a participant section each of the participating room for display on the centre stage display of the other participating rooms. This is generally a higher quality video requiring higher bandwidth of 2.5 to 5 Mbps as on date. In the embodiment illustrated, three cameras have been provided to capture three participant sections in high resolution. The system is therefore capable of being configured for functioning as a TeleAllpresence™ system as described in Applicant's co-pending Application Number 568/DEL/2011. The same system with the teachings of this invention can now also be configured to transmit data from only one high resolution camera for the active participant section. Alternatively, the system could be configured with only two cameras, one for providing the entire participating room on the participant stage and the other for providing the active participant section on the center stage.

Participating room 2 (Location 2) further includes a control panel (T201), a control processor (CP 201) and a network switch (NS201). The network switches (NS201, NS001) include components required for setting up the telepresence call such as a router. Similar configurations of display system, codecs, cameras, control panel, control processor and network switch is provided at the other participating rooms as well. The displays at each location are preferably large-scaled flat screens (between 58" to 65" preferably) placed side by side in two rows, with the cameras appropriately placed in between to maintain good eye contact. The number of display for the center stage is preferably one.

Referring next to FIG. 1B, thirty three participating rooms in the embodiment are illustrated. Each participating room in the example illustrated is provided with a set of three displays, three codecs and three cameras. For example, participating room 2 (Location 2) includes three displays of which two are configured as participant stage displays (P201, P202) and one is configured as the center stage display (CS 201). The system as disclosed is capable of being configured for functioning as a conventional telepresence system that requires three displays or as a Dynamic TeleAllpresence™ as taught by the present disclosure and is further capable of switching between the two modes of operation.

A Codec (coder/decoder) is a hardware or software that performs digital compression of audio and video streams. The control panel is powered by modules that provide a user interface facilitating initiation of calls and performance of other Input/Output functions related to the conference. The control panel also assists users to select the participating rooms for the conference and allocate available bandwidth through the central control system. The control processor of each participating room connects with the central control system (112) that also controls the Multipoint Control Unit or MCU (114). MCU (114) is a device/devices configured to serve as a bridge/bridges among different participating rooms in a teleconference call.

In accordance with an aspect of the invention, a telepresence participating room initiates a conference through its control panel and connects with the central control system (112). The control panel of the initiating participating room transmits details of available infrastructure and also provides the central control system details of the conference and the participating rooms. The central control system in turn instructs the MCU/s about the participating rooms and how the various codecs at all the participating rooms are to be connected using available resources. The central control system not only transmits instructions to the MCU/s about various participating rooms and how to set up connections between them, but also keeps track of the status of the conference, removes the connected participating rooms from the address books of other participating rooms, identifies addresses of codecs at the participating rooms, allocates bandwidth for the conference, rearranges communication links when a participating room joins or leaves during the conference, etc. The central control system (112) sends a continuous stream of Internet protocol (IP) packets to the control processors of the participating rooms via the network switch (NS 001). The IP packets may include details indicating the nature of the call, addresses of the respective codecs etc.

Figure 2:
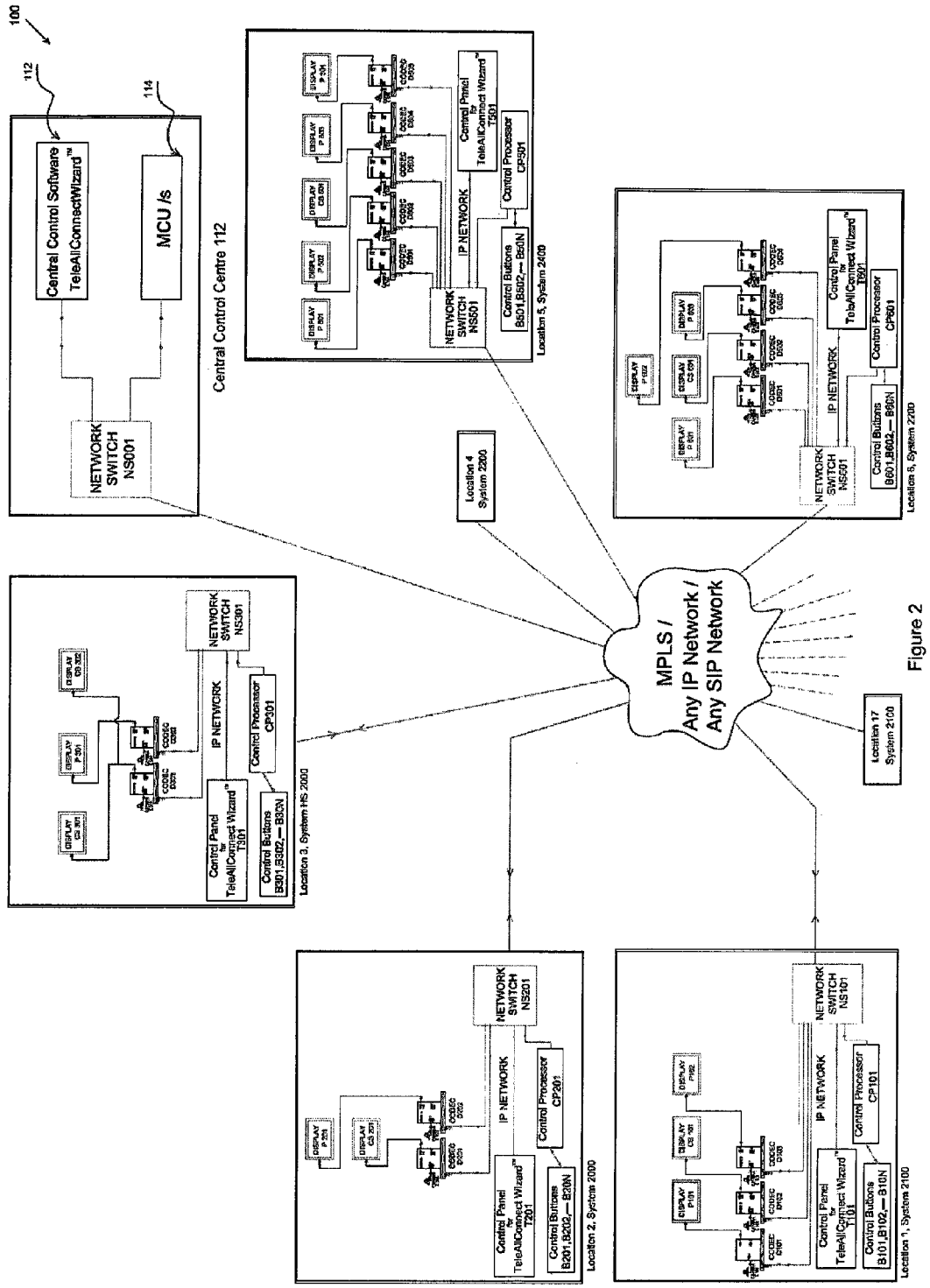
FIG. 2 illustrates a telepresence system in accordance with an alternate embodiment of the invention.

In accordance with an embodiment of the invention, each participating room may have different configuration of the Dynamic TeleAllpresence™ system. FIG. 2 illustrates an example of a Dynamic TeleAllpresence™ setting where seventeen Dynamic TeleAllpresence™ systems at seventeen participating rooms are in conference with each other in accordance with an embodiment of the invention. A conference between various Dynamic TeleAllpresence™ systems (100) is arranged by setting up location-to-location connections between MCU (114) and codecs of each participating room by the central control system (112).

Referring to FIG. 2, a Dynamic TeleAllpresence™ call between seventeen participating rooms is illustrated with participating room 1 (Location 1) having three displays, (System 2100), participating room 2 (Location 2) having two displays (System 2000), participating room 3 (Location 3) having three displays of which two are configured as center stage displays and one is configured as participant stage display (System HS 2000), participating room 5 (Location 5) having five displays (System 2400) and participating room 6 (Location 6) having four displays (System 2200). In such set ups the central control system by giving instructions to the MCU/s (114) allocates codecs between participating rooms such that each participating room is able to see the active speaking participant section on their center stage display/s along with seeing all the participating rooms on the participant stage display/s.

The number of displays required depends on the number of total participating rooms sought to be connected and the relative quality of experience sought. The displays with the center stage are preferably placed below the participant stage displays. At a minimum two large displays are required, one serving as the participant stage display and the other as the center stage display. In accordance with a preferred embodiment, two displays are required at each location with one display serving as the centre stage display and one display serving as participant stage display. In other embodiments, the number of centre stage displays remains as one but the number of participant stage displays increase to 2 or 3 or 4. The center stage is preferably located centrally on the bottom row of displays except in a U shape or V shape or a horse shoe sitting layout where two identical centre stage displays are provided besides one participant stage display. Referring to participating room 3 (Location 3) of FIG. 2, the telepresence system facilitates an experience similar to telepresence even in a horse shoe sitting layout which has not been possible till now. Participating room 3 (Location 3) in FIG. 2 uses two cameras and three displays along with two codecs so as to provide in a U/V/horseshoe shape sitting layout excellent eye contact with the far site audience for every speaker participating room along with lifelike real size images of the speaker on the center stage displays (CS301, CS302) and complete view of all the speakers on the participant stage display (P301).

Figure 4:
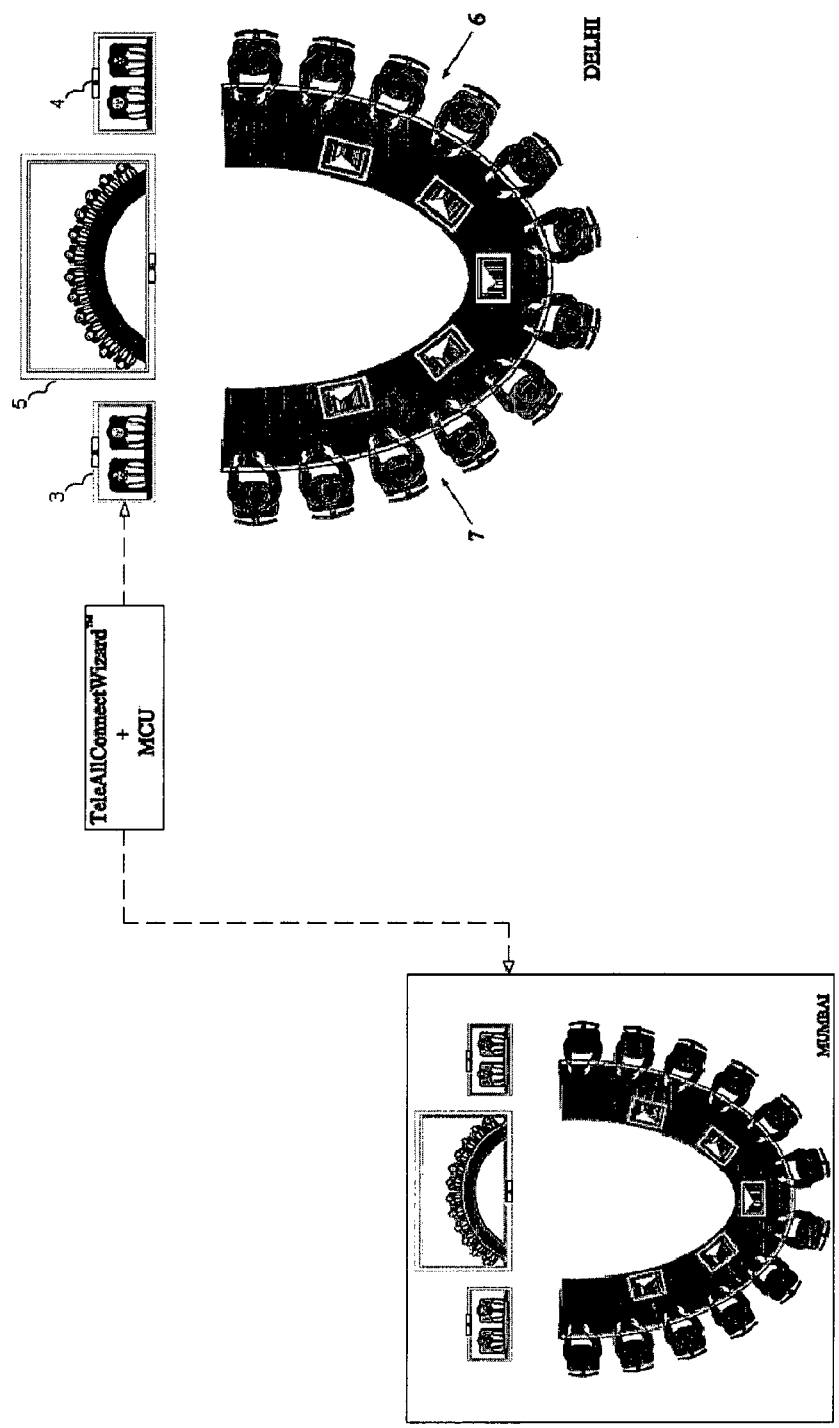
FIG. 4 illustrates an example of a telepresence system where 2 participating rooms are in conference with each other in accordance with an embodiment of the invention.

Referring to FIG. 4, that is a set up similar to participating room 3 (Location 3) of FIG. 2, two displays (3, 4) serve as centre stage displays with each display having identical video. The two centre stage displays (3, 4) are positioned on either side of the third display which is the participant stage display (5) with respective cameras at such an angle that participants (6) on one side of the table can see one centre stage display (3) and participants (7) on the other side of the table can see the centre stage display (4) comfortably. The image displayed on the center stage 3 and 4 is the active participant section from the other participating rooms.

Figure 5:
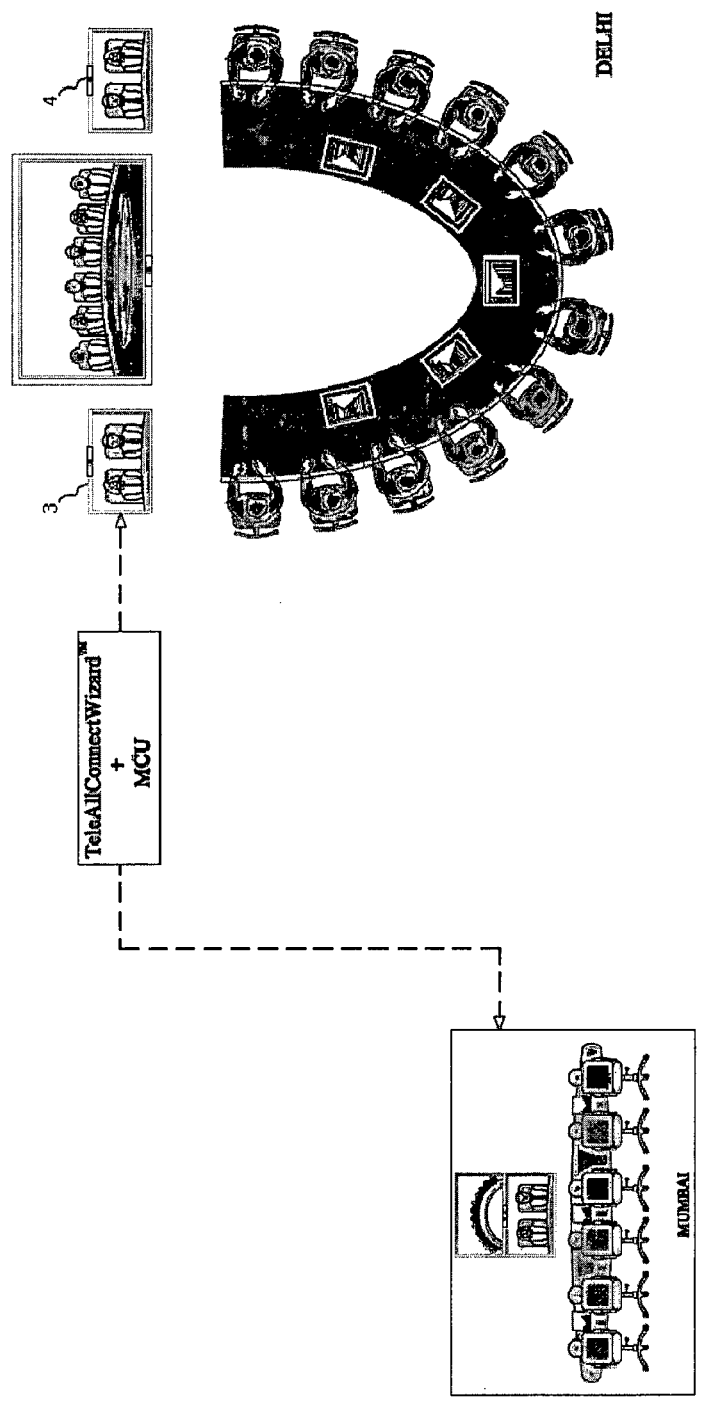
FIG. 5 illustrates an example of a telepresence system where 2 participating rooms are in conference with each other in accordance with an embodiment of the invention.

Referring to next FIG. 5, the system is also configured to set up Dynamic TeleAllpresence™ meetings between participating rooms having different seating configuration. As illustrated, participating room Delhi is shown to have "U" shaped seating whereas participating room Mumbai is shown to have conventional rectangular/elliptical. For location Delhi with the U shaped seating, two identical centre stage displays (3, 4) are provided so that all participants can see the centre stage comfortably irrespective of where they are sitting.

Figure 3:
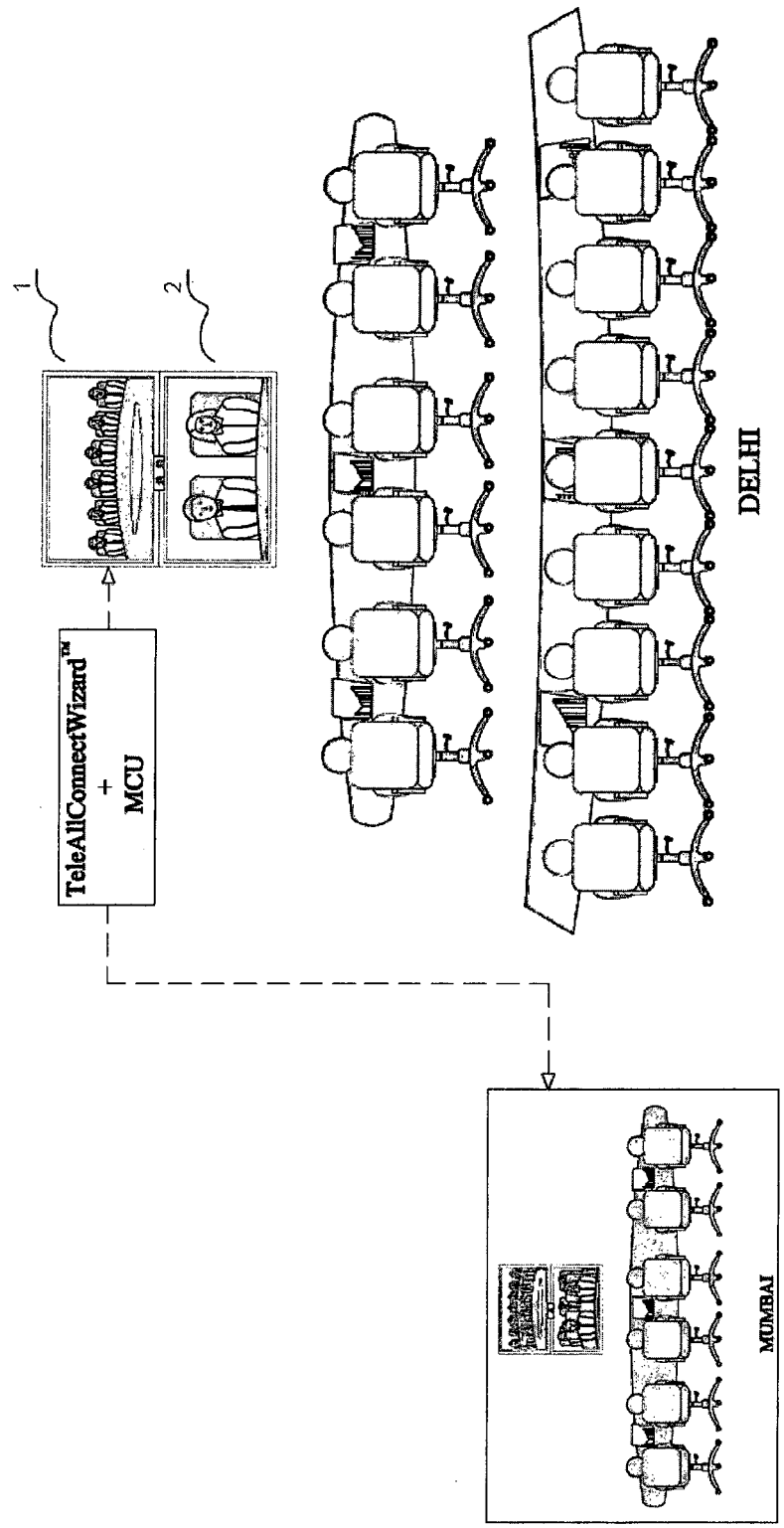
FIG. 3 illustrates an example of a telepresence system where 2 participating rooms are in conference with each other in accordance with an embodiment of the invention.

Referring next to FIG. 3, two participating rooms (Delhi, Mumbai) are shown in conference with each participating room having two displays. The displays are arranged in two rows with the display (2) in the bottom row serving as the center stage on which the active participant section of the active speaking participating room or the second participating room, if only two participating rooms are connected, is displayed. The other display (1) on the top row is configured to simultaneously display all the other participating rooms. If only two locations are connected then it shows only the second participating room.

Each participating room can simultaneously see all the other participating rooms as well as all the other participants at each participating room in the participant stage display (1) as well as the active participant section of the active speaker participating room on the center stage (2) in a real size and lifelike mode. The active participant section of the speaker participating room to be displayed on the centre stage of other participating room is selected by pressing the corresponding control button in a particular participating room and that participating room becoming the active speaker participating room; one participant section of that participating room is displayed on the centre stage of the other participating rooms. Any default participant section may be set to be displayed if no button is pressed or a participant at the speaking participating room may select the participant section by pressing the button in front of them. If the other participants from the same speaking participating room further want to speak then they come to the centre stage by just pressing their respective control button. The participant section selected is that participant section of the participating room that covers the person speaking in the room. When a control signal originates in a participant section of a participating room, that participant section is considered an active participant section and the display system is configured to display the active participant section in lifelike mode on the center stage as well as continuously display all the participating rooms on the participant stage. Alternatively, either when an audio signal originates in a participating room that participating room is considered an active participant room or when a control signal originates in a participant section of a participating room, that participating room is considered an active participating room and that participant section is considered an active participant section, and the display system is configured to display the active participating room or the active participant section in a lifelike mode on the center stage as well as continuously display all the participating rooms on the participant stage.

As seen in FIG. 3, the participants in participating room Delhi can see two participants (from total of 6 participants) from participating room Mumbai on their centre stage (2) along with seeing all participants from Mumbai on their second display, participant stage (1) and the participants in participating room Mumbai can see five participants (from total 15 participants) from participating room Delhi on their centre stage along with seeing all participants of Delhi on the second display. In other words, only a participant section of the speaker participating rooms is displayed on the centre stage which is active or speaking along with the entire location participants visible on the second display.

For display on the center stage, the participating room may be covered by 1 camera and 1 codec though the participating room view is divided into three participant sections. If one participant from one of the participant sections presses the control button and starts speaking, the camera immediately pans, tilts and zoom where the speaker is sitting and starts displaying the speaker and other participants in that area on the centre stage in such a way that they appear lifelike and real size. In this case, the speakers from the other participant sections of the Mumbai location can be seen in lifelike real size presence when they press their control button. Similarly speakers from the participating room Delhi can be seen in lifelike real size presence in participating room Mumbai when they press their control button. All this time both the participating rooms are also continuously seeing all the participants from the other participating room at all times. So for a two participating rooms Dynamic TeleAllpresence™ conference the experience is similar to a conventional two participating rooms Telepresence conference. Though here the capital cost is low and there is a bandwidth saving of approximately 40%.

In accordance with an aspect, all participating rooms can see 2-6 participants from the active participating room on the centre stage in lifelike mode from all seating locations at all times depending on the seating of participants In accordance with an embodiment of the invention, the telepresence system is configured to display the participant section of the active speaker participating room on the center stage (2) within few seconds of a switch in speaker participating room.

Figure 6:
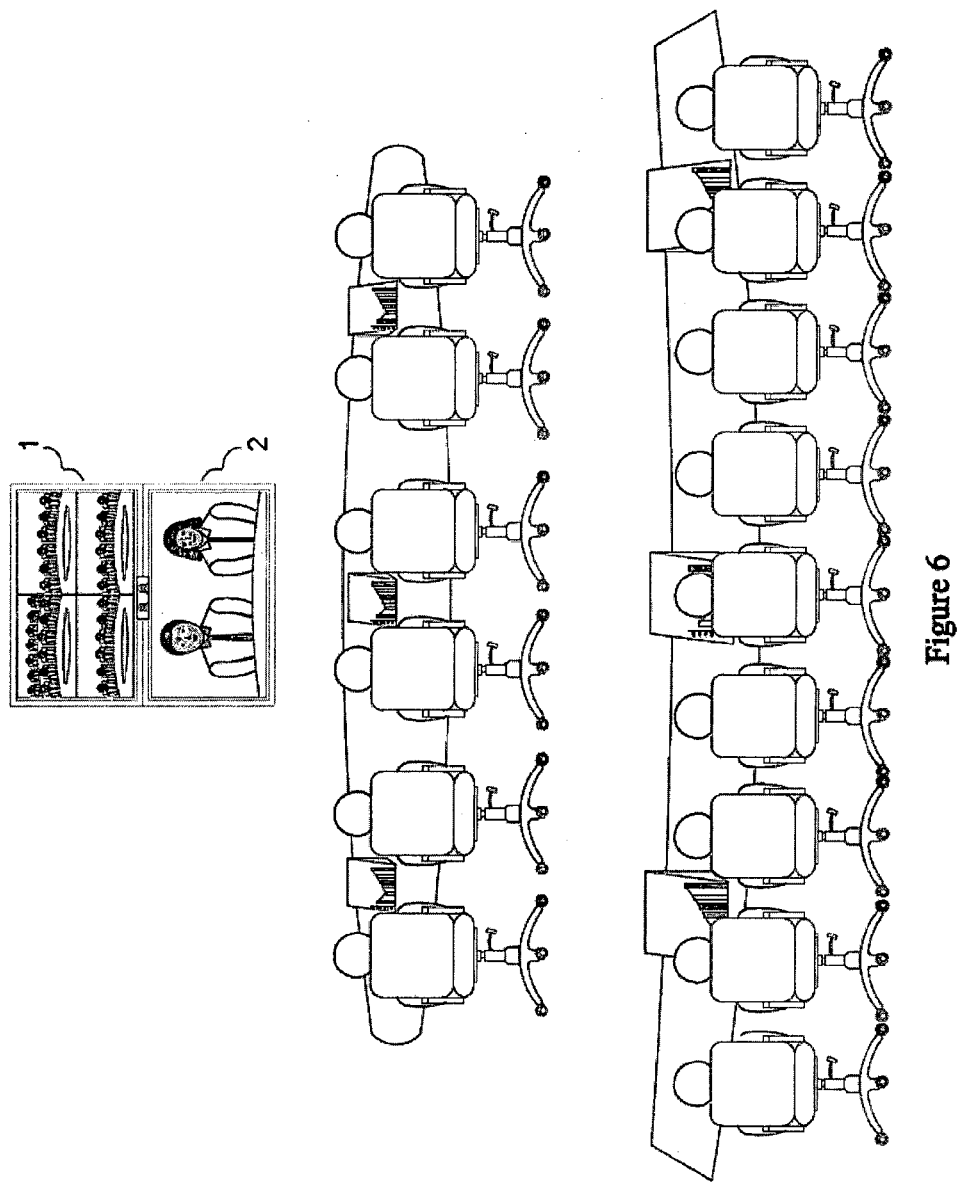
FIG. 6 illustrates an example of a Dynamic TeleAllpresence™ system where 5 participating rooms are in conference with each other in accordance with an embodiment of the invention.

In accordance with an embodiment of the invention, as more participating rooms are added the telepresence system (100) is configured to divide the participant stage displays further to accommodate the newly added participating rooms. FIG. 6 shows new locations participating rooms added, so the participant stage display gets divided further to accommodate the newly added participating rooms. In accordance with an embodiment of the invention, one participant stage display may be divided to show a maximum of sixteen participating rooms.

Figure 7:
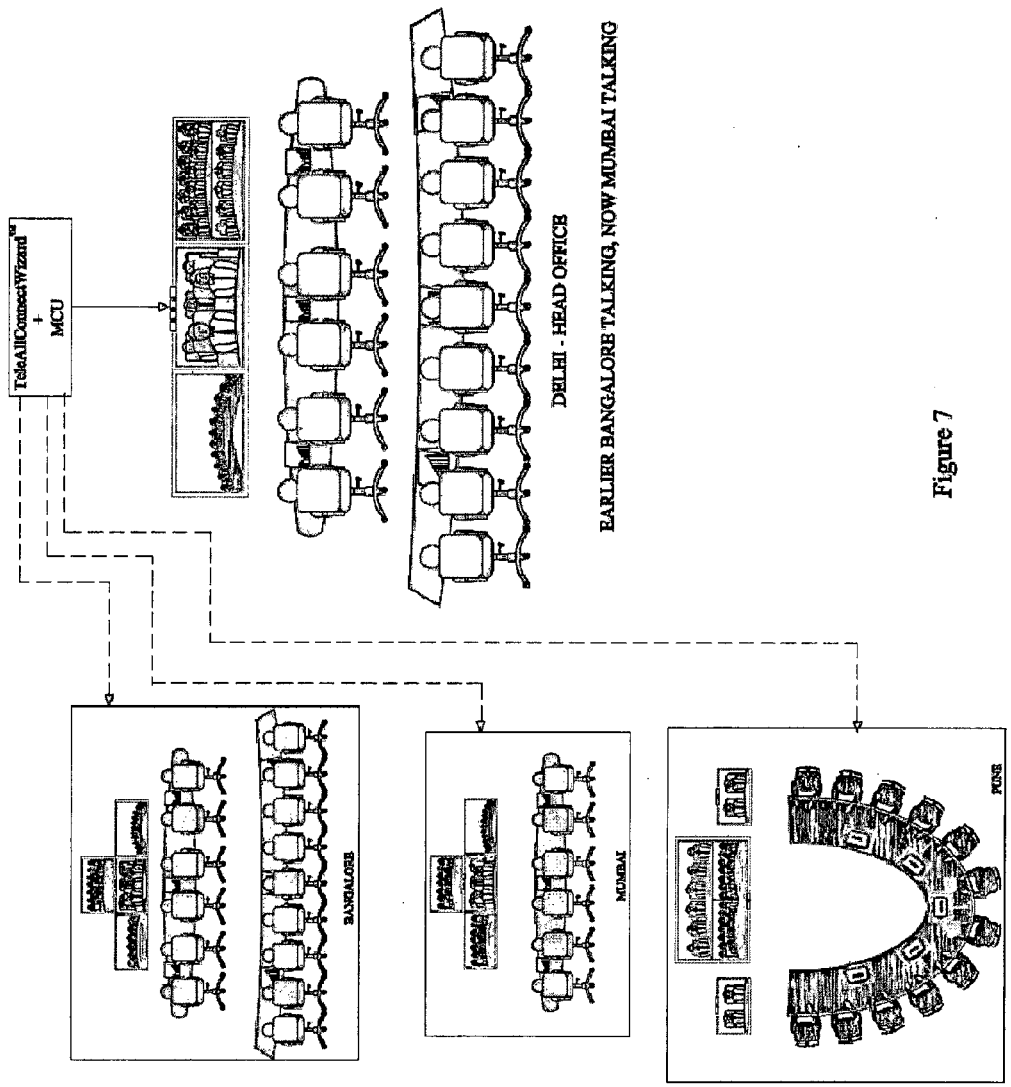
FIG. 7 illustrates an example of a Dynamic TeleAllpresence™ system in accordance with an embodiment of the invention.
Figure 8:
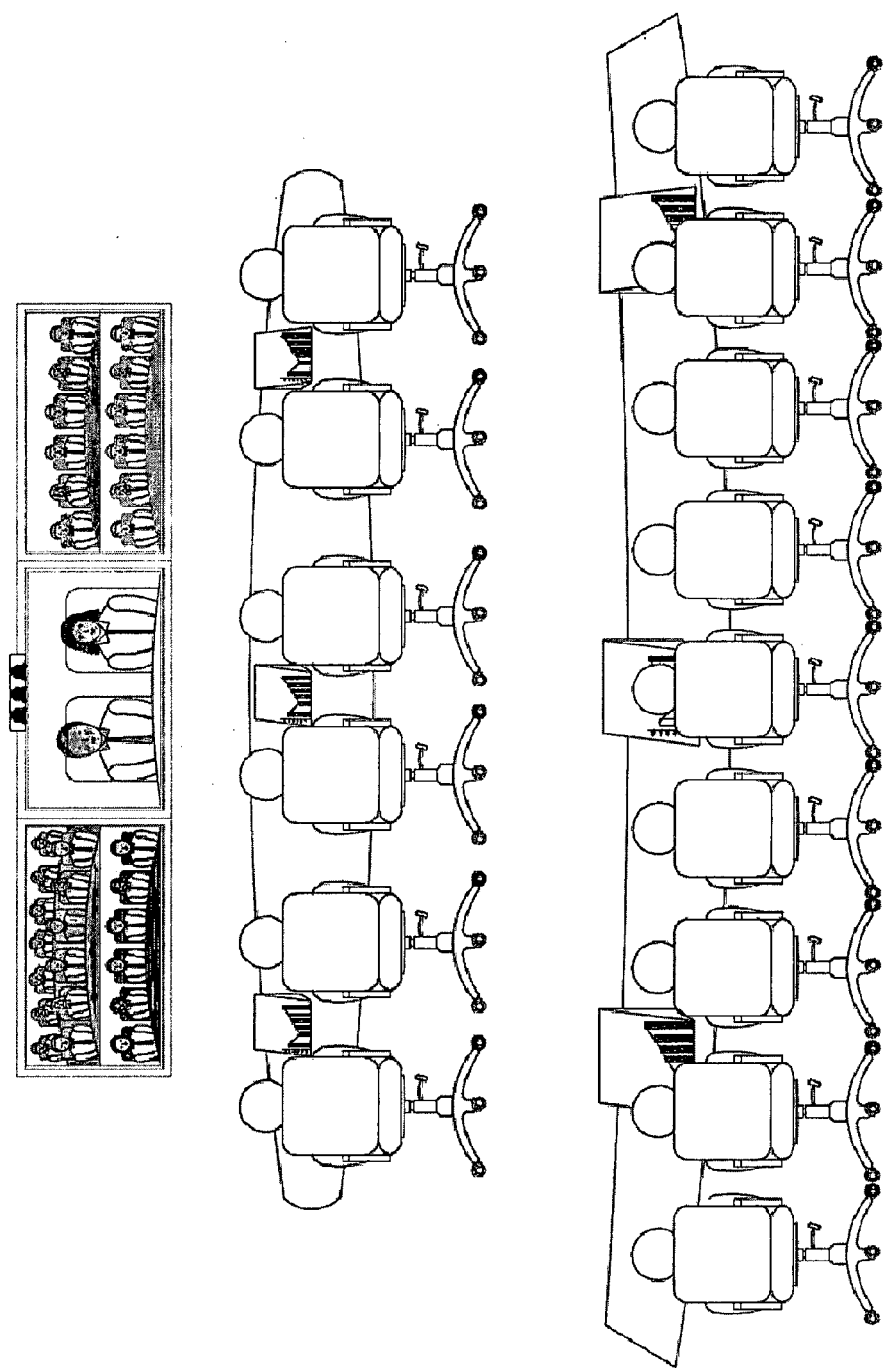
FIG. 8 illustrates an example of a Dynamic TeleAllpresence™ system in accordance with an embodiment of the invention.

With reference to FIGS. 7 and 8, various embodiments of the participant stage display and the participating rooms are illustrated, with the number of participating rooms varying. As illustrated in FIG. 7, a total of four participating rooms are in conference with different display set ups, while FIG. 8 illustrates a total of five participating rooms in conference. In the display set up of FIGS. 7 and 8, the center stage comprises of one display with different number of participant stage displays, except for location Pune where two center stage displays are provided.

Figure 9:
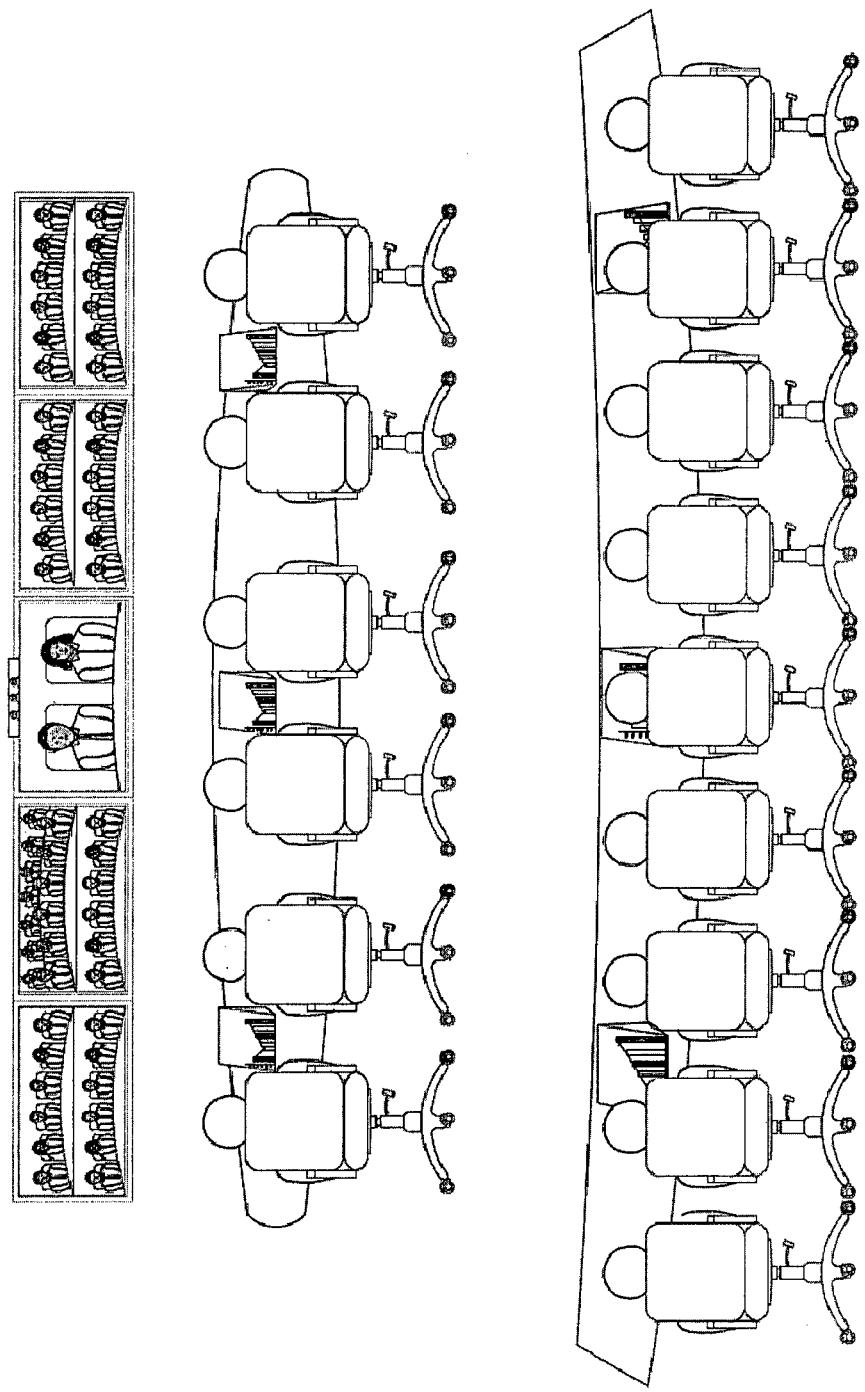
FIG. 9 illustrates an example of a Dynamic TeleAllpresence™ system in accordance with an embodiment of the invention.
Figure 10:
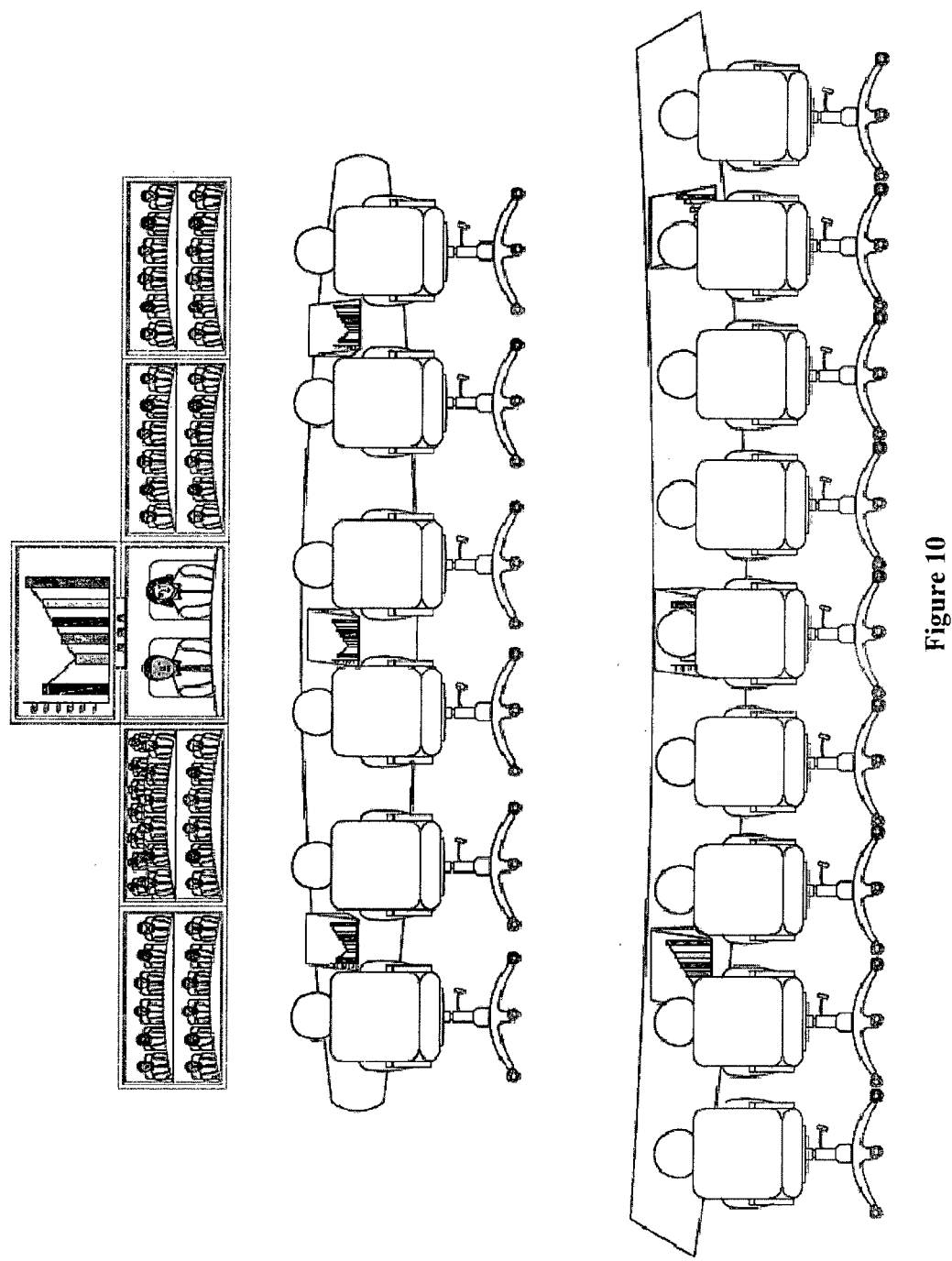
FIG. 10 illustrates an example of a Dynamic TeleAllpresence™ system in accordance with an embodiment of the invention.

In FIG. 9, a total of nine participating rooms are in conference, the display setup shown for a participating room comprises of five displays with one dedicated to serve as a centre stage and four for displaying the participating rooms. In FIG. 10, one display is configured for presentation data and other shared applications.

In accordance with an embodiment of the invention, the tables at one or more participant location are provided with motorized pop up displays to display presentations or other shared materials as illustrated in FIG. 10.

INDUSTRIAL APPLICABILITY

The Dynamic TeleAllpresence™ system is configured to effectively reduce the capital cost and the bandwidth required for the transmitting high quality videos to other locations especially in a TeleAllpresence™ system as described in Indian Patent Application 568/DEL/2011.

The Dynamic TeleAllpresence™ system is also configured to effectively reduce the capital cost and the bandwidth required for achieving a high quality equivalent telepresence experience for even two locations.

The Dynamic TeleAllpresence™ also provides a system and method for getting Telepresence experience for the first time in U shape, V shape and even horse shoe sitting arrangements that was not possible before.

The Dynamic TeleAllpresence™ also provides a system and method to switch between higher bandwidth telepresence experience and a lower bandwidth telepresence experience. Therefore, the same display set up used to view an entire participating room which requires higher bandwidth can also be used on a lower bandwidth to view only a section of the participating room.

While specific language has been used to describe the invention, any limitations arising on account of the same are not intended. As would be apparent to a person in the art, various working modifications may be made to the system in order to implement the inventive concept as taught herein.

The invention claimed is:

1. A telepresence participating room configured for audio visual communication with a plurality of other participating rooms, the telepresence participating room comprising:
    a plurality of participant sections;
    a display system including a center stage and a participant stage;
    a plurality of codecs for powering the display system;
    a plurality of cameras for sharing audio-visuals with the other participating rooms;
    a network switch for enabling communication with the other participating rooms; and
    a control panel in communication with the network switch, configured for call initiation, selection of participating rooms and allocation of available bandwidth;
    such that either when an audio signal originates in a participating room that participating room is considered an active participating room or when a control signal originates in a participant section of a participating room, that participating room is considered an active participating room and that participant section is considered an active participant section;
    wherein the display system is configured to display the active participating room or the active participant section in lifelike mode on the center stage as well as continuously display all the participating rooms on the participant stage.

2. A telepresence participating room as claimed in claim 1 further comprising at least one control button configured to generate the control signal.

3. A telepresence participating room as claimed in claim 2 further comprising a control button for each participant section of the telepresence participating room.

4. A telepresence participating room as claimed in claim 1 wherein the display system comprises of a plurality of displays, with at least one display dedicated as a center stage display.

5. A telepresence participating room as claimed in claim 4 wherein at least one display is dedicated as a participant stage display.

6. A telepresence participating room as claimed in claim 5 wherein the center stage display is positioned between two or more participant stage displays.

7. A telepresence participating room as claimed in claimed 5 wherein the participant stage display is positioned between two or more identical center stage displays.

8. A telepresence system comprising:
    a plurality of participating rooms each comprising a plurality of participant sections, a display system, a plurality of codecs for powering the display system, a plurality of cameras for sharing audio-visuals with other participating rooms, a network switch for enabling communication with the other participating rooms, and a control panel in communication with the network switch, configured for call initiation, selection of participating rooms and allocation of available bandwidth;
    such that either when an audio signal originates in a participating room that participating room is considered an active participating room or when a control signal originates in a participant section of a participating room, that participating room is considered an active participating room and that participant section is considered an active participant section; wherein the display system of at least one participating room comprises of a center stage and a participant stage; and
    a central control system in communication with the network switch of each participating room and configured to connect the plurality of participating rooms in audio visual communication with each other, the control system further configured to identify a participating room with a display system having a center stage and a participant stage and to display the active participating room or the active participant section in lifelike mode on the center stage as well as continuously display all the participating rooms on the participant stage.

9. A telepresence system as claimed in claim 8 wherein each of the plurality of participating rooms further comprises at least one control button configured to generate the control signal.

10. A telepresence system as claimed in claim 9 further comprising a control button for each participant section of each of the participating rooms.

11. A telepresence system as claimed in claim 8 wherein the display system of the participating rooms comprising of the center stage and the participant stage comprises of a plurality of displays, with at least one display dedicated as a center stage display.

12. A telepresence system as claimed in claim 11 wherein at least one display is dedicated as a participant stage display.

13. A telepresence system as claimed in claim 12 wherein the center stage display is positioned between two or more participant stage displays.

14. A telepresence participating room as claimed in claimed 12 wherein a participant stage display is positioned between two or more identical center stage displays.

15. A method of conducting an audio-visual telepresence conference between a plurality of participating rooms, at least one participating room comprising:
- a plurality of participant sections;
- a display system including a center stage and a participant stage;
- a plurality of codecs for powering the display system;
- a plurality of cameras for sharing audio-visuals with other participating rooms;
- a network switch for enabling communication with the other participating rooms; and
- a control panel in communication with the network switch, configured for call initiation, selection of participating rooms and allocation of available bandwidth;

such that when a control signal originates in a participant section of a participating room that participant section is considered an active participant section;

the method comprising:
identify a participating room with a display system having a center stage and a participant stage and to display the active participant section in lifelike mode on the center stage as well as continuously displaying all the participating rooms on the participant stage or that participating room.

16. A method as claimed in claim 15 wherein either when an audio signal originates in a participating room that participating room is considered an active participating room or when a control signal originates in a participant section of a participating room, that participating room is considered an active participating room and that participant section is considered an active participant section; further comprising:
identify a participating room with a display system having a center stage and a participant stage and displaying the active participating room or the active participant section in lifelike mode on the center stage as well as continuously displaying all the participating rooms on the participant stage of that participating room.

17. A method as claimed in claim 15 further comprising displaying a default participant section as the active participant section in the absence of a control signal.

18. A method as claimed in claim 16 further comprising displaying a default participant section as the active participant section in the absence of a control signal.

* * * * *